(12) United States Patent
Iguchi (10) Patent No.: US 10,864,438 B2
(45) Date of Patent: Dec. 15, 2020

(54) PROGRAM, INFORMATION PROCESSING DEVICE, AND CONTROL METHOD

(71) Applicant: GREE, Inc., Tokyo (JP)

(72) Inventor: Hiroki Iguchi, Tokyo (JP)

(73) Assignee: GREE, Inc., Tokyo (JP)

( * ) Notice: Subject to any disclaimer, the term of this patent is extended or adjusted under 35 U.S.C. 154(b) by 214 days.

(21) Appl. No.: 16/048,530

(22) Filed: Jul. 30, 2018

(65) Prior Publication Data

US 2019/0030428 A1 Jan. 31, 2019

(30) Foreign Application Priority Data

Jul. 31, 2017 (JP) .................................. 2017-148512

(51) Int. Cl.
| | |
|---|---|
| *A63F 13/69* | (2014.01) |
| *A63F 13/35* | (2014.01) |
| *G07F 17/32* | (2006.01) |
| *A63F 13/25* | (2014.01) |

(52) U.S. Cl.
CPC .............. *A63F 13/35* (2014.09); *A63F 13/25* (2014.09); *A63F 13/69* (2014.09); *G07F 17/329* (2013.01)

(58) Field of Classification Search
None
See application file for complete search history.

(56) References Cited

U.S. PATENT DOCUMENTS

2014/0274276 A1* 9/2014 Daniels ............... G07F 17/3286
463/18

FOREIGN PATENT DOCUMENTS

JP 2017-012940 A 1/2017

* cited by examiner

*Primary Examiner* — Jay Trent Liddle
*Assistant Examiner* — Alex P. Rada, II
(74) *Attorney, Agent, or Firm* — Maier & Maier, PLLC (57) ABSTRACT

A program, embodied on a non-transitory computer-readable medium, which causes an information processing device that executes a game to execute: a step of causing an interface that accepts a user operation to be displayed; a step of storing first information related to game content on the basis of the user operation that is accepted by the interface; a step of storing second information related to game content that is selected among a plurality of items of game content by game content selection processing and is associated with a user; a step of comparing the first information and the second information; a step of causing a comparison result of the first information and the second information to be displayed; and a step of making a predetermined game effect capable of being exhibited in the game on the basis of comparison of the first information and the second information.

20 Claims, 7 Drawing Sheets

| USER INFORMATION | | | | |
|---|---|---|---|---|
| IDENTIFICATION INFORMATION | CHARACTERISTIC INFORMATION | | | |
| USER ID | USER NAME | RANK | OWNED GAME MEDIUM INFORMATION | GAME PARAMETER |
| U01 | USER A | *** | *** | *** |
| U02 | USER B | *** | *** | *** |
| U03 | USER C | *** | *** | *** |
| ... | ... | ... | ... | ... |

FIG.3

| GAME MEDIUM | | | | |
|---|---|---|---|---|
| IDENTIFICATION INFORMATION | CHARACTERISTIC INFORMATION | | | |
| GAME MEDIUM ID | GAME MEDIUM NAME | RARITY | LEVEL | NUMBER OF USABLE TIMES |
| U01 | CHARACTER A | NORMAL | 1 | 10 |
| U02 | CHARACTER B | RARE | 10 | 0 |
| U03 | CHARACTER C | RARE | 20 | 3 |
| ... | ... | ... | ... | ... |

INFORMATION THAT IS USED IN GAME MEDIUM
SELECTION PROCESSING IN GAME PARAMETER A

| GAME MEDIUM ID | SELECTION PROBABILITY | SELECTION SEQUENCE |
|---|---|---|
| C01 | 1% | 1 |
| C02 | 5% | 4 |
| C03 | 5% | 3 |
| C04 | 10% | 2 |
| . . . | . . . | . . . |
| TOTAL | 100% | — |

(b)

INFORMATION THAT IS USED IN GAME MEDIUM
SELECTION PROCESSING IN GAME PARAMETER B

| GAME MEDIUM ID | SELECTION PROBABILITY | SELECTION SEQUENCE |
|---|---|---|
| C01 | 50% | 2 |
| C02 | 50% | 1 |
| TOTAL | 100% | — |

FIRST INFORMATION RELATED TO GAME MEDIUM

| No. | CHARACTERISTIC INFORMATION OF GAME MEDIUM | | INFORMATION OF NUMBER OF GAME MEDIA |
|---|---|---|---|
| | GAME MEDIUM NAME | RARITY | |
| 1-1 | — (NOT SET) | SUPER-RARE | — |
| 1-2 | CHARACTER B | NORMAL | — |
| 1-3 | — | RARE | 3 |

(b)

SECOND INFORMATION RELATED TO GAME MEDIUM

| No. | GAME MEDIUM ID | CHARACTERISTIC INFORMATION OF GAME MEDIUM | | |
|---|---|---|---|---|
| | | GAME MEDIUM NAME | RARITY | LEVEL |
| 2-1 | C05 | CHARACTER A | SUPER-RARE | 1 |
| 2-2 | C09 | CHARACTER B | RARE | 1 |
| 2-3 | C11 | CHARACTER C | NORMAL | 1 |
| 2-4 | C20 | CHARACTER D | RARE | 1 |
| 2-5 | C35 | CHARACTER E | RARE | 1 |

FIG.7

PROGRAM, INFORMATION PROCESSING DEVICE, AND CONTROL METHOD

FIELD

The present disclosure relates to a program, an information processing device, and a control method.

BACKGROUND

In the related art, a lottery game in which a user selects game content such as a card and an item is known. For example, Patent Literature 1 discloses a lottery game in which an item that is used by a user is provided by lottery.

Patent Literature 1, referenced above, is Japanese Patent Application No. JP-A-2017-012940.

SUMMARY

In the related art, in a game in which a user selects game content, the game becomes monotonous, and thus there is a possibility that a user may lose their motivation to continue playing a game.

The present disclosure has been made in consideration of the above-described circumstance, and an object thereof is to provide a program, an information processing device, and a control method which are capable of improving a user's motivation to continue playing a game in a game in which a user selects game content such as a card.

According to an exemplary embodiment, there may be provided a program that allows an information processing device that executes a game to execute: a step of causing an interface that accepts a user operation to be displayed; a step of storing first information related to game content on the basis of a user operation that may be accepted by the interface; a step of storing second information related to game content that may be selected among a plurality of items of game content by game content selection processing and may be associated with a user; a step of comparing the first information and the second information; a step of causing a comparison result of the first information and the second information to be displayed; and a step of making a predetermined game effect capable of being exhibited in the game on the basis of comparison of the first information and the second information.

According to another exemplary embodiment, there may be provided an information processing device including a display unit, an input unit that can accept a user operation with respect to the display unit, a storage unit, and a control unit that executes a game. The control unit displays an interface that accepts the user operation on the display unit, stores first information related to game content in the storage unit on the basis of the user operation that may be accepted by the interface, stores second information related to game content that may be selected among a plurality of items of game content by game content selection processing and may be associated with a user in the storage unit, compares the first information and the second information, displays a comparison result of the first information and the second information on the display unit, and makes a predetermined game effect capable of being exhibited in the game on the basis of comparison of the first information and the second information.

According to still another exemplary embodiment, there may be provided a method of controlling an information processing device that executes a game. The control method includes: a step of causing an interface that accepts a user operation to be displayed; a step of storing first information related to game content on the basis of the user operation that may be accepted by the interface; a step of storing second information related to game content that may be selected among a plurality of items of game content by game content selection processing and may be associated with a user; a step of comparing the first information and the second information; a step of causing a comparison result of the first information and the second information to be displayed; and a step of making a predetermined game effect capable of being exhibited in the game on the basis of comparison of the first information and the second information.

According to the program, the information processing device, and the control method according to an exemplary embodiment, it may be possible to improve a user's motivation to continue playing a game.

DETAILED DESCRIPTION

Hereinafter, an exemplary embodiment of the present disclosure will be described with reference to the accompanying drawings.

Figure 1:
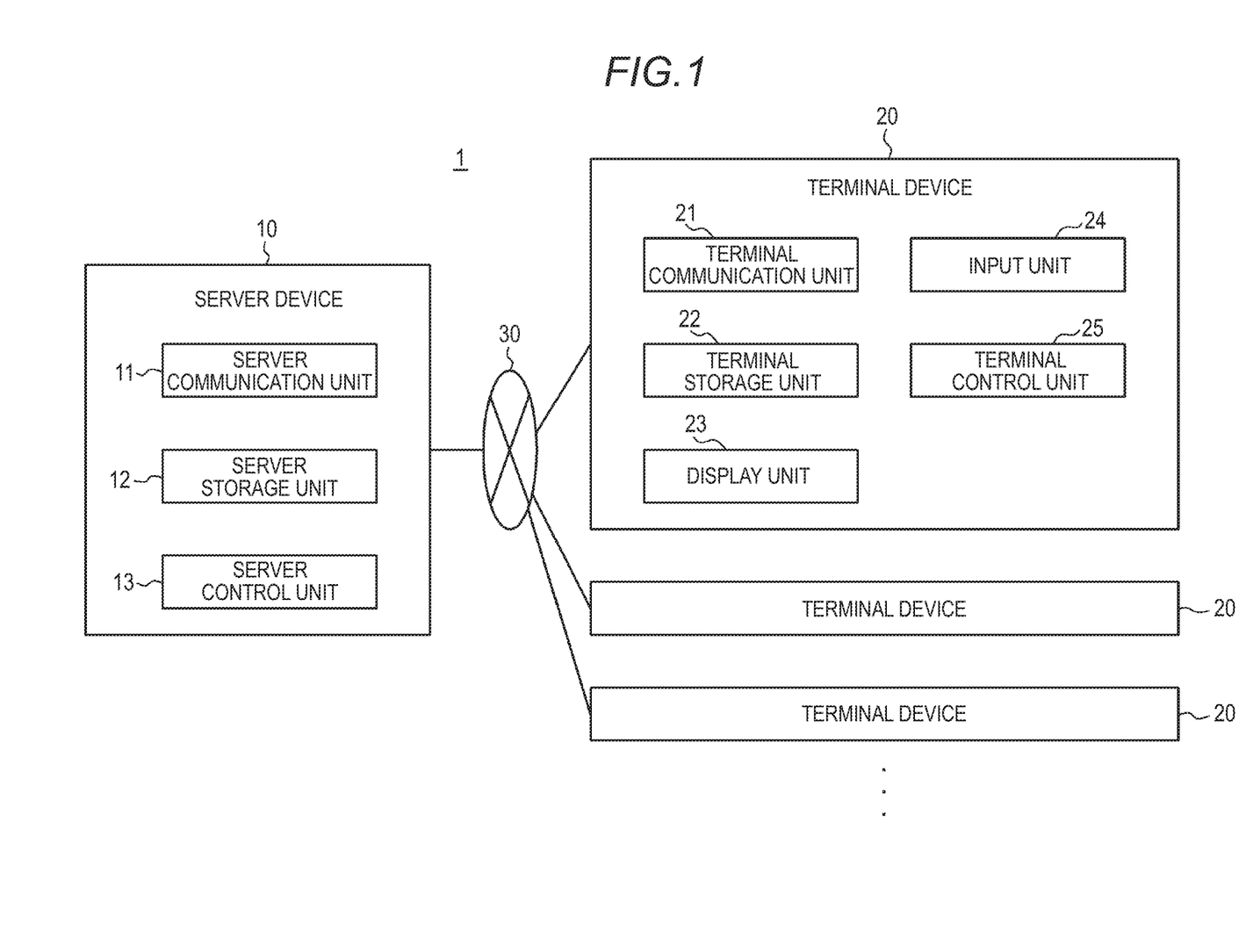
FIG. 1 is a block diagram of an exemplary embodiment of a game system.

Description will be given of an overview of a game system 1 according to an exemplary embodiment with reference to FIG. 1. The game system 1 may include a server device 10 and one or more terminal devices 20. In FIG. 1, three terminal devices 20 are illustrated for convenience, but the number of the terminal device 20 may be determined in an arbitrary manner.

For example, the server device 10 may be an information processing device such as a server that may be managed by a game operator. For example, each of the terminal devices 20 may be an information processing device such as a portable phone, a smartphone, a tablet terminal, a personal computer (PC), and a game device which are used by a user. The terminal device 20 can execute a game application according to this embodiment. For example, the game application may be transmitted from a predetermined application distribution server to the terminal device 20 through a network 30 such as the Internet, or may be stored in advance in a storage medium such as a storage device that may be provided in the terminal device 20 or a memory card that may be readable by the terminal device 20. The server device 10 and the terminal device 20 may be connected to each other through the network 30 in a communication possible manner.

The server device 10 and the terminal device 20 may execute various kinds of processing related to a game in cooperation with each other. For example, the server device and the terminal device 20 may execute a series of processing in a sharing manner. In addition, for example, the server device 10 and the terminal device 20 may execute the same process. With regard to the above-described processing, in a case where processing results of the server device 10 and the terminal device 20 match each other, the server device 10 and the terminal device 20 may complete the processing. On the other hand, when the processing results of the server device 10 and the terminal device 20 may be different from each other, the server device 10 and the terminal device 20 may complete the processing with the processing result of the server device 10 set as a correct result, or may return to a process before execution of the processing. According to the above-described configuration, for example, even in a case where communication quality between the server device 10 and the terminal device 20 temporarily deteriorates, a possibility that the processing may be instantly stopped decreases. In addition, in the terminal device 20, even in a case where unauthorized processing such as rewriting of parameters is performed, it may be more possible to reject the unauthorized processing.

Description will be given of an overview of a game according to this embodiment. The game according to this embodiment may include one or more game parts. Among the game parts, at least one game part may be executed by using game content. During execution of the game part, the game content may be operated, for example, by a user.

The game content may be electronic data that may be used in the game, and examples thereof include arbitrary media such as a card, an item, a virtual currency, a ticket, a character, an avatar, level information, status information, parameter information (a physical power value, offensive power, and the like), and capability information (skill, ability, magic word, job, and the like). In addition, the game content may be electronic data that can be acquired, owned, used, managed, exchanged, composed, enhanced, sold, discarded, or donated by a user in the game, but usage aspects of the game content may not be limited to aspects stated explicitly in this specification.

Hereinafter, "game content owned by a user" represents game content that may be associated with a user ID that can uniquely identify the user as an owned game content unless particularly specified. In addition, "game content may be given to a user" represents that the game content may be associated with a user ID as an owned game medium. In addition, "game content owned by a user may be discarded" represents that association between a user ID and an owned game content may be canceled. In addition, "game content owned by a user may be consumed" represents that it may be possible to cause any effect or any influence to occur in a game due to cancellation of association between a user ID and an owned game medium. In addition, "game content owned by a user may be sold" represents that association between a user ID and an owned game content may be cancelled, and another game content (for example, a virtual currency, an item, and the like) may be associated with the user ID as an owned game medium. In addition, "game content owned by a user A may be assigned to a user B" represents that association between a user ID of the user A and the owned game content may be cancelled, and the game content may be associated with a user ID of a user B as an owned game medium. In addition, "game content may be created" represents that at least a part of information related to game content may be defined or determined.

A game part may be a content that can be played by a user in a game, and examples thereof include a quest, a mission, a minigame, acquisition, growth, strengthening, composition of game content, search of a virtual space, and a battle with an opponent (for example, another user, an opponent character, a building of the opponent, and the like), and the like. One or more predetermined game tasks may be set to each game part. In a case where it is determined that accomplishment of one or more game tasks set to a game part played by a user succeeds, for example, an item of game content and the like may be given to the user as a reward. As the game tasks, for example, arbitrary tasks corresponding to contents of the game part can be employed, and examples thereof include a task of winning in a battle with an opponent character, a task of arriving at a goal site in a virtual space, and a task in which a character of a user does not enter a predetermined state (for example, a disabled state) until a predetermined time has elapsed. In addition, among one or more game tasks which may be set to the game part, accomplishment of a specific game task (completion task) may be also referred to as "completion of the game part". In a case where a user that plays the game part succeeds in accomplishment of the completion task, it may be determined that the game part may be completed, and the game part may be terminated.

A game part in which game content selection processing of selecting game content that may be associated with a user among a plurality of items of game content may be performed may be included in the game according to this embodiment. Examples of the game part in which the game content selection processing may be performed include a lottery game part. The lottery game part may be performed when the user makes a request by consuming a ticket, a virtual currency, and the like. Then, the game content selection processing may be executed in correspondence with the ticket, the virtual currency, and the like which may be consumed, and game content such as a card and an item which may be selected may be associated with a user as a lottery result. In addition, the game part in which the game content selection processing may be performed may not be limited to the lottery game part. For example, the game content selection processing may be performed in a game part such as a game part in which a quest may be performed, and a game part in which a battle with an opponent may be performed other than the lottery game part. For example, the game content that may be selected by the game content selection processing may be associated with the user when completing a predetermined condition such as a condition in which the quest may be completed and a condition in which the opponent may be beaten down. Here, game content selection method in the game content selection processing may not be limited to selection based on a probability, and may be determined in an arbitrary manner. For example, a selection method in which game content may be selected among a plurality of items of game content on the basis of a predetermined selection probability that is associated with the game content may be used. In addition, a method in which game content may be selected among a plurality of items of game content in accordance with the order that may be determined in advance for the game content may be used. The game content selection processing may be performed by the server device 10 or the terminal device 20. In addition, the game content selection processing may be executed by the server device 10 and the terminal device 20 in cooperation with each other. In addition, the game content selection processing may be executed once or a plurality of times. The user can play another game part by using game content that may be given to the user.

A configuration of the server device 10 will be described in detail. The server device 10 may include a server communication unit 11, a server storage unit 12, and a server control unit 13.

The server communication unit 11 may include an interface that communicates with an external device in a wireless or wired manner, and transmits and receives information. For example, the server communication unit 11 may include a wireless local area network (LAN) communication module, a wired LAN communication module, and the like. The server communication unit 11 can transmit and receive information to and from the terminal device 20 through the network 30.

For example, the server storage unit 12 may include a semiconductor memory, a magnetic memory, an optical memory, or the like. For example, the server storage unit 12 may function as a primary storage device or a secondary storage device. The server storage unit 12 stores information and a program that can be used in execution of a game. At least a part of the information and the program which may be stored in the server storage unit 12 may be shared and synchronized with the terminal device 20. Hereinafter, description will be given of an example of the information that may be stored in the server storage unit 12.

Figure 2:
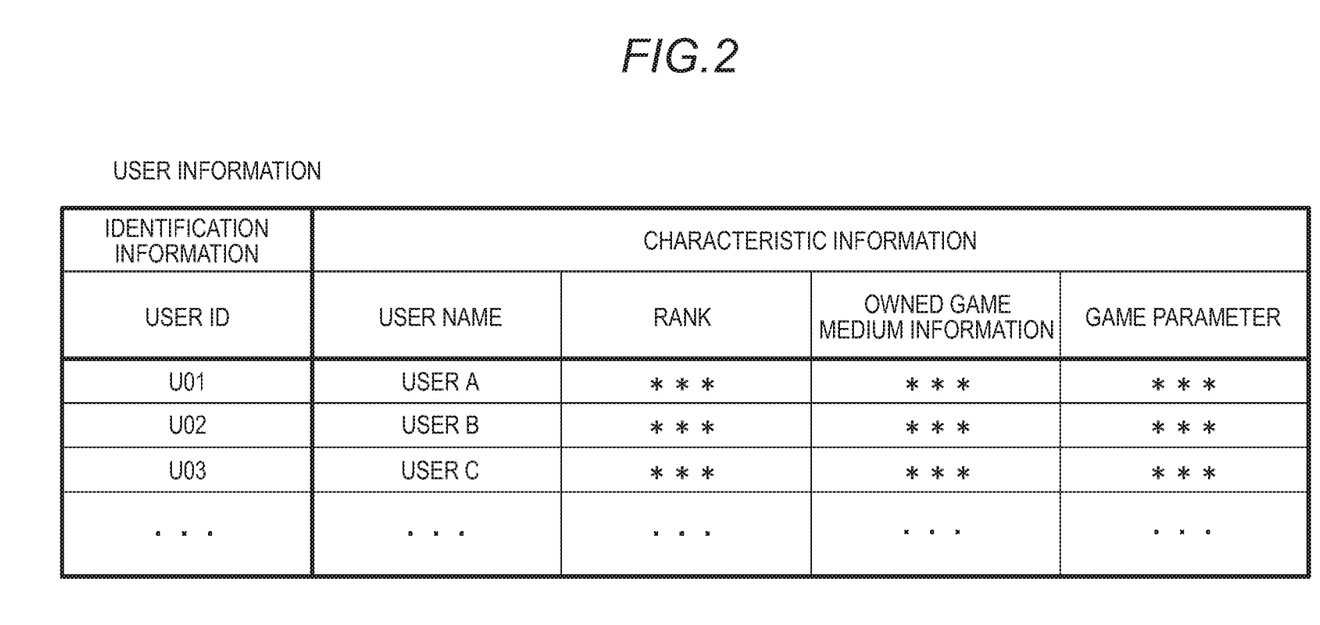
FIG. 2 is an exemplary embodiment of a view illustrating information related to a user.

Description will be given of information related to a user with reference to FIG. 2. The information related to a user may be information that may be necessary for a user to operate a game, and can be created for every user. For example, the information related to a user may include a user ID that may be identification information capable of uniquely identifying a user, and characteristic information that may be associated with the user ID and indicates characteristics of the user. In this specification, the user ID may also be referred to simply as "user". For example, the characteristic information may include a user name, the rank, owned game content information, and a game parameter. Contents of the characteristic information may not be limited to the above-described example. The characteristic information may include arbitrary information indicating characteristics of the user. The characteristic information may be updated on the basis of a user operation, or may be automatically updated by a game system.

In this embodiment, the user name may be information indicating the name of a user. The rank may be information indicating game-related proficiency of the user. For example, the higher the rank is, the higher the game-related proficiency of the user is. A value of the rank may increase in correspondence with playing of the game by the user. The owned game content information may include information that specifies game content that may be owned by the user in the game. As the owned game content information, for example, a game content ID to be described later, and the like can be used. In a case where an item of game content may be given to the user, the game content may be associated with the user as an owned game content. The game parameter may be a parameter that can be used when the user plays the game. The game parameter may include information related to the number of items of game content given at a time, information related to game content selection probability, and the like, for example, in a lottery game part.

Figure 3:
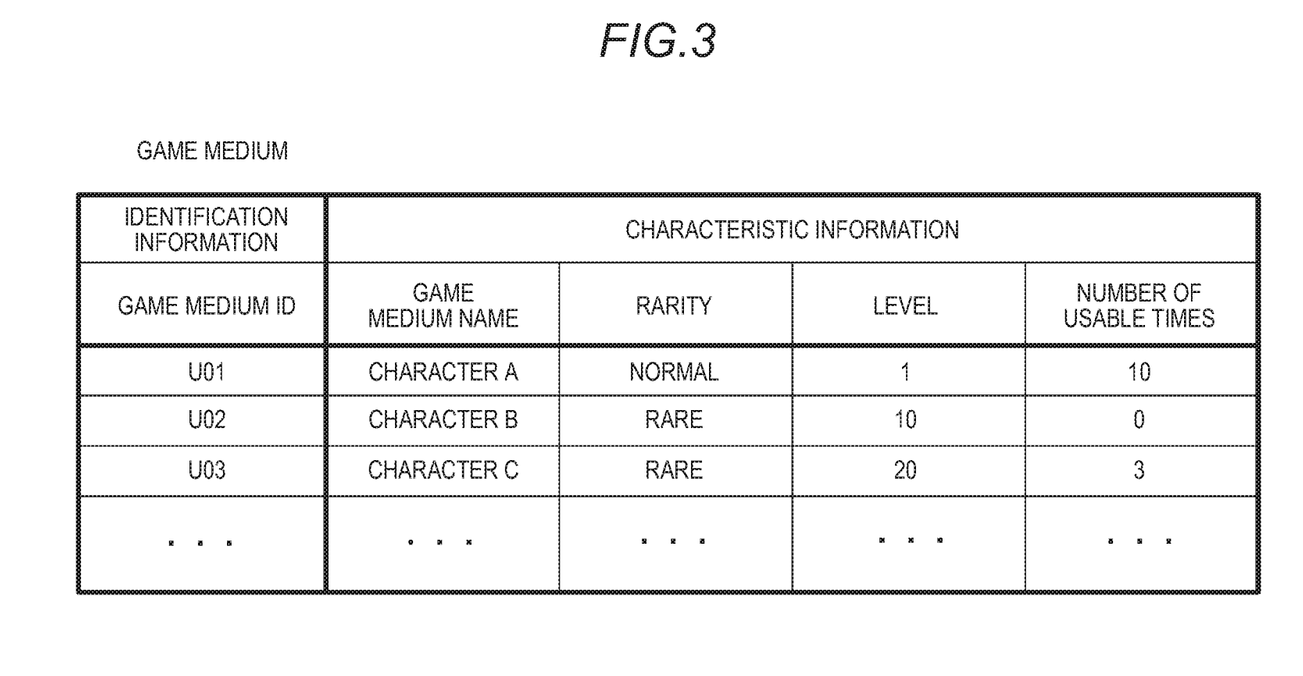
FIG. 3 is an exemplary embodiment of a view illustrating information related to game content.

Information related to game content will be described with reference to FIG. 3. For example, the information related to game content may include game content ID that may be identification information capable of uniquely identifying game content, and characteristic information that may be associated with the game content ID and indicates characteristics of the game medium. For example, the characteristic information may include game content name, rarity, a level, and the number of usable times. The contents of the characteristic information may not be limited to the above-described example. The characteristic information may include arbitrary information indicating characteristics of the game medium. The characteristic information may be updated on the basis of a user operation, or may be automatically updated by a game system.

In this embodiment, the game content name may be information indicating the name of game content. The level may be information indicating the degree of growth of the game content. For example, the greater a value of the level is, the greater the degree of growth of the game content is. The value of the level may increase in correspondence with playing of the game by a user. The number of usable times may be information indicating the number of times capable of using the game content in the game. For example, the number of usable times decreases one by one whenever using the game medium. When the number of usable times becomes 0, the game content may be difficult to use.

Figure 4:
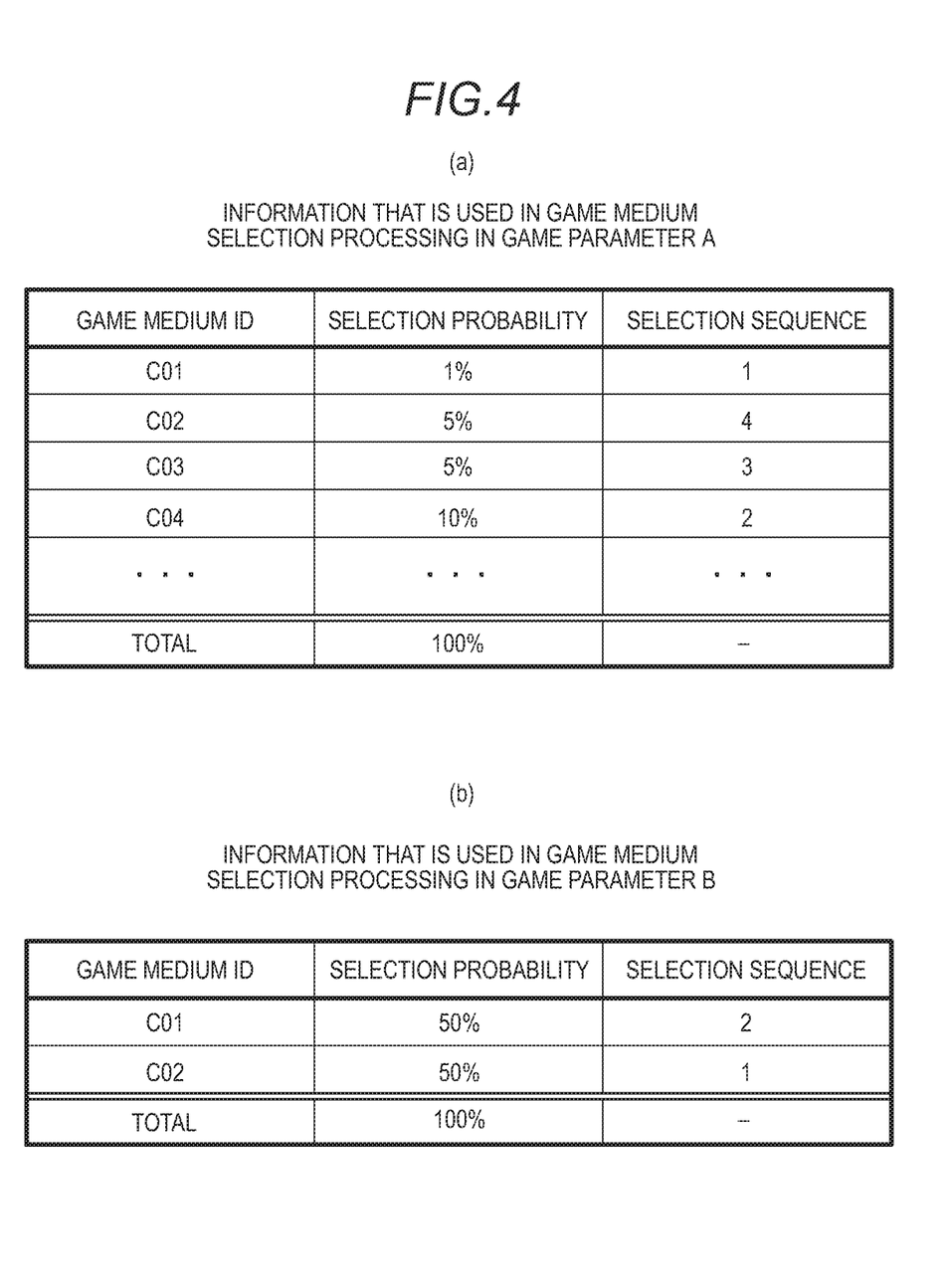
FIG. 4 is an exemplary embodiment of a view illustrating information that can be used in game content selection processing.

Description will be given of information that can be used in game content selection processing with reference to FIG. 4. For example, the information that can be used in the game content selection processing may include the game content ID that may be included in the above-described information related to game content, a selection probability that may be associated with the game content ID, and a selection sequence. The number of game content IDs included in the information, the selection probability that may be associated with each of the game content IDs, and the selection sequence may be changed, for example, in correspondence with the game parameter included in the above-described information related to a user as illustrated in FIG. 4. In addition, contents of the information may not be limited to the above-described example. The information may include arbitrary information that can be used in the game content selection processing. In the game content selection processing, an item of game content can be selected among a plurality of items of game content on the basis of a predetermined selection probability that may be associated with the game content ID. In addition, in the game content selection processing, an item of game content can be selected among a plurality of items of game content in accordance with a predetermined selection sequence that may be associated with the game content ID. Furthermore, the number of the plurality of items of game content which may be selection targets in the game content selection processing may be limited, or an item of game content that may be selected once may be excluded in the subsequent or later game content selection processing. According to the above-described configuration, in a case where 10 pieces of game content are set as targets, when the game content selection processing is executed once and game content is selected, the subsequent game content selection processing may be performed in a state in which the selected game content may be excluded and nine pieces of game content may be set as targets. In this case, when a target game content becomes zero, the game content selection processing may be set to be more difficult to execute.

Figure 5:
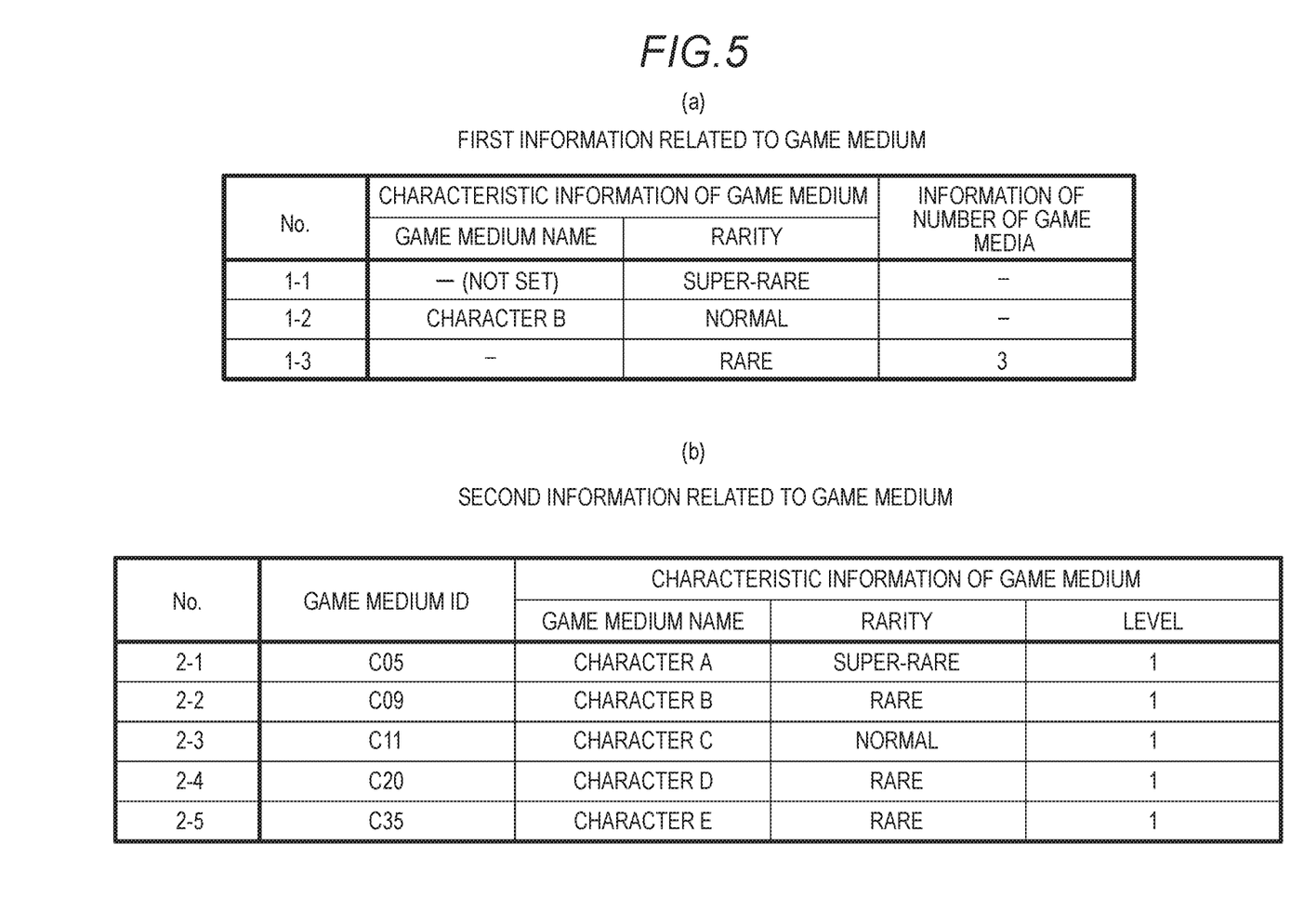
FIG. 5 is an exemplary embodiment of a view illustrating first information and second information which relate to the game medium.

Description will be given of first information and second information which relate to items of game content with reference to FIG. 5. The first information related to the game content may be information related to game content which may be set on the basis of a user operation. In addition, the second information related to the game content may be information related to game content selected among a plurality of items of game content by the game content selection processing and may be associated with a user. The first information and the second information which can be used in this embodiment may include information for comparison by a terminal control unit 25 to be described later, and it may not be necessary to include the entirety of pieces of the information related to game content. In addition, the first information and the second information may include information other than the information related to game content. For example, the first information may include at least one of characteristic information of the game content such as game content name and rarity, and information of the number of items of game content. An example of the first information may be illustrated in 1-1 to 1-3 in FIG. 5. For example, as in 1-1 of FIG. 5, information including only rarity may be set. In addition, as in 1-2 and 1-3, a plurality of pieces of information related to game content such as the game content name and the rarity, or the rarity and the information of the number of pieces may be set. In addition, the second information may include game content ID that may be identification information of the game medium, and characteristic information of the game content such as game content name, rarity, and a level. An example of the second information may be illustrated in 2-1 to 2-5 in FIG. 5. The second information may include information related to a plurality of items of game content among 2-1 to 2-5 in correspondence with the number of items of game content which may be selected by the game content selection processing and may be associated with a user. For example, in a case where the number of items of game content associated with the user may be one, the second information may include only 2-1. In addition, in a case where the number of items of game content associated with the user may be five, the second information may include the entirety of 2-1 to 2-5. These pieces of information may be illustrative only, and the first information and the second information may include arbitrary information without limitation to the above-described example. For example, the first information may include only one of the characteristic information of the game medium, and the information of the number of items of game content, or may include information such as an image of the game content other than the characteristic information of the game medium, and the information of the number of items of game content. Similarly, the second information may include only a part of the characteristic information of the game medium, and may further include the characteristic information of the game content such as the number of usable times and the selection probability.

The server control unit 13 illustrated in FIG. 1 may include one or more processors. The processors may include a general-purpose processor, and a specific processing-specific dedicated processor. The server control unit 13 may control an operation of the entirety of the server device 10. Hereinafter, an example of the operation of an exemplary embodiment of the server control unit 13 will be described in detail.

The server control unit 13 may store information and a program that can be used in processing of a game in the server storage unit 12.

The server control unit 13 may perform transmission and reception of the information through the server communication unit 11. For example, the server control unit 13 may transmit at least a part of the information stored in the server storage unit 12 to the terminal device 20. In this case, the information stored in the server storage unit 12 and information stored in the terminal device 20 may be shared and synchronized. For example, a timing of performing sharing and synchronization of the information may include a timing at which new information may be stored in the server storage unit 12, and a timing at which information stored in the server storage unit 12 may be updated, but may be determined in an arbitrary manner. In addition, for example, the server control unit 13 may retrieve arbitrary information that may be input or determined in the terminal device 20 through the server communication unit 11. For example, the information may include information that may be input by a user operation.

The server control unit 13 may execute a game in cooperation with the terminal device 20. For example, the server control unit 13 may execute a game part in cooperation with one or more terminal devices 20. Details of the operation of the server device 10 and the terminal device 20 which may execute the game part will be described later.

A configuration of an exemplary embodiment of the terminal device 20 will be described in detail. As illustrated in FIG. 1, the terminal device 20 may include a terminal communication unit 21, a terminal storage unit 22, a display unit 23, an input unit 24, and a terminal control unit 25.

The terminal communication unit 21 may include an interface that communicates with an external device in a wireless or wired manner, and transmits and receives information. For example, the terminal communication unit 21 may include a wireless communication module corresponding to mobile communication standards such as long term evolution (LTE) (registered trademark), a wireless LAN communication module, a wired LAN communication module, and the like. The terminal communication unit 21 can transmit and receive information to and from the server device 10 through the network 30.

For example, the terminal storage unit 22 may include a semiconductor memory, a magnetic memory, an optical memory, or the like. For example, the terminal storage unit 22 may function as a primary storage device or a secondary storage device. The terminal storage unit 22 may be built-in the terminal device 20, or may be connected to the terminal device 20 through an arbitrary interface. The terminal storage unit 22 may store information and a program that can be used in processing of a game. For example, the terminal storage unit 22 may store a game application program retrieved from a predetermined application distribution server. Hereinafter, the application program may also be referred to simply as an "application". The terminal storage unit 22 may store some or the entirety of the information related to a user, the information related to game content, the information that can be used in the game content selection processing, and the first information and the second information which relate to the game content which may be retrieved from the server device 10.

For example, the display unit 23 may include display devices such as a liquid crystal display and an organic EL display. The display unit 23 can display various screens.

For example, the input unit 24 may include input devices such as a pointing device including a mouse, physical keys, and a touch panel that may be provided integrally with the display unit 23. When the input devices may be operated by a user, the input unit 24 can accept the user operation as an input to an interface. For example, the interface may include a graphic user interface (GUI) that may be displayed on a screen, and the like. The user can operate the input unit 24 while viewing interface contents displayed on the display unit 23.

The terminal control unit 25 may include one or more processors. The terminal control unit 25 may control an operation of the entirety of the terminal device 20. Hereinafter, an example of the operation of an exemplary embodiment of the terminal control unit 25 will be described in detail.

The terminal control unit 25 may perform transmission and reception of information through the terminal communication unit 21. For example, the terminal control unit 25 may retrieve information and a program which may be used in processing of a game. Specifically, the terminal control unit 25 may retrieve a game application from a predetermined application distribution server. The terminal control unit 25 may retrieve a part or the entirety of the information related to game content from the server device 10.

The terminal control unit 25 may activate the game application in correspondence with a user operation. The terminal control unit 25 may execute a game in corporation with the server device 10. For example, the terminal control unit 25 may display a screen that may be used in the game on the display unit 23. For example, a GUI that accepts the user operation may be displayed on the screen. The terminal control unit 25 can accept the user operation with respect to the screen through the input unit 24.

The operation of exemplary embodiments of the server device 10 and the terminal device 20 which execute the game part in cooperation with each other will be described in detail. Here, description will be given of a configuration in which the server device 10 and the terminal device 20 execute the same processing, and the server device 10 compares a processing result of the server device 10 and a processing result of the terminal device 20. For convenience of explanation, the operation of the terminal device 20 will be described, and the operation of the server device 10 that may execute the same processing as in the terminal device 20 will be omitted.

The terminal control unit 25 may display an interface that may accept a user operation on the display unit 23. According to this, a user can input first information related to the game content from the input unit 24 in accordance with the interface that may be displayed. Details of the interface displayed on the display unit 23 will be described later with reference to a specific example.

The terminal control unit 25 may store the first information related to the game content on the basis of the user operation that may be accepted by the interface. It may not be necessary for the entirety of information included in the first information to be set on the basis of the user operation. For example, the terminal control unit 25 may set a part of the first information to the interface in advance and display the part of the first information on the display unit 23, and may set the remainder of the first information on the basis of the user operation and store the remainder in the terminal storage unit 22 as the first information. In addition, the terminal control unit 25 may display information related to game content other than the first information on the user interface. For example, the terminal control unit 25 may set an image of the game content to the user interface and display the image on the display unit 23, and may specify first information corresponding to the selected image on the basis of the user operation and may store the first information in the terminal storage unit 22 as the first information.

The server control unit 13 may select game content that may be associated with a user among a plurality of items of game content in accordance with the game content selection processing. For example, the server control unit 13 may select game content that may be associated with a user among a plurality of items of game content on the basis of a predetermined selection probability that may be associated with the game medium. In addition, when executing the game content selection processing, the server control unit 13 may refer to a game parameter of the user. For example, as illustrated in FIG. 4, information that may be used in the game content selection processing may be changed between a case where the game parameter of the user may be A and a case where the game parameter may be B. For example, in the case of the game parameter B of the user, the server control unit 13 may select game content that may be associated with a user at a selection probability of 50% between items of game content having game content ID of C01 and game content ID of C02. The number of items of game content which may be associated with the user may be arbitrary. As in game content selection processing in a lottery game, there may be processing of which a processing result may be different whenever the processing may be executed even under the same condition. In this case, the processing may be executed by only one of the server device or the terminal device 20. Here, the game content selection processing may be executed only by the server device 10.

The terminal control unit 25 may store the second information related to game content that may be selected among a plurality of items of game content by the game content selection processing and may be associated with a user. For example, in a case where the game content selection processing is executed by the server control unit 13, the second information related to the game content may be transmitted from the server communication unit 11 to the terminal communication unit 21 through the network 30. The terminal control unit 25 may store the received second information related to the game content in the terminal storage unit 22. On the other hand, in a case where the game content selection processing is executed by the terminal control unit 25, the terminal control unit 25 may store the second information related to the game medium, which may be calculated by the game content selection processing, in the terminal storage unit 22.

The terminal control unit 25 may compare the first information and the second information which relate to the game content with each other. In the comparison of the first information and the second information, determination may be made on the basis of whether or not at least a part of the first information and at least a part of the second information match each other. Specifically, the terminal control unit 25 may determine whether or not information that matches the second information may be present for every characteristic information of the game content set to the first information and information of the number of items of game content. For example, in the case of comparing first information 1-1 and second information 2-1 with each other with reference to FIG. 5, the terminal control unit 25 may make a determination on the basis of matching of rarity that may be a part of the first information 1-1 and rarity that may be a part of the second information 2-1. Since the rarity of the first information 1-1 and the rarity of the second information 2-1 match each other, the terminal control unit 25 may make a determination as "matching". On the other hand, in the case of comparing first information 1-2 and second information 2-2 with each other, the terminal control unit 25 may make a determination on the basis of matching of a game content name and rarity which may be parts of the first information 1-2, and a game content name and rarity of the second information 2-2 which may be parts of the second information 2-2. Since in the first information 1-2 and the second information 2-2, the game content name is the same, but the rarity is different, the terminal control unit 25 may make a determination that these items of game content are "nonmatching". In addition, in the case of comparing first information 1-3 and a plurality of pieces of second information 2-1 to 2-5 with each other, the terminal control unit 25 may make a determination on the basis of matching of rarity and information of the number of pieces which may be parts of the first information 1-3, and rarity that may be a part of the second information 2-1. Since the number of items of game content which may have a rarity (included in 2-1 to 2-5) of "rare" is 3, the terminal control unit 25 may make a determination of the first information 1-3 as "matching". In the determination as to whether or not at least a part of the first information and at least a part of the second information match each other, the terminal control unit 25 may make a determination on the basis of a score obtained by counting the number of pieces of characteristic information which matches between the first information and the second information, or the number of game content IDs of the second information having the characteristic information. In addition, the terminal control unit 25 may perform different weighting for every matched characteristic information (for example, weight in a case of matching of the rarity may be set to 3, and weight in the case of matching of the game content name may be set to 1) or for every characteristic of the characteristic information (for example, weight in the case of matching of the rarity as super-rare may be set to 6, and weight in the case of matching of the rarity as rare may be set to 4), and then may make a determination on the basis of a score obtained by adding the weight. The terminal control unit 25 may store the characteristic information that matches between the first information and the second information, the score, and the like in the terminal storage unit 22 as a comparison result. The method of comparing the first information and the second information with each other may be illustrative only, and may not be limited to the method that may be explicitly described in this specification. The method of comparing the first information and the second information with each other may be determined in an arbitrary manner.

The terminal control unit 25 may display the comparison result between the first information and the second information on the display unit 23 to notify a user of the comparison result. Here, the terminal control unit 25 may change a display method and production in the display unit 23 in correspondence with the comparison result. For example, the terminal control unit 25 may display an additional screen or reproduce a predetermined moving image in correspondence with matched contents between the first information and the second information. In addition, the terminal control unit 25 may display contents of a game effect that may be capable of being exhibited in a game in a manner integrated with the comparison result in correspondence with the comparison. The comparison result displayed on the display unit 23 may be described later with reference to a specific example.

The terminal control unit 25 may make a predetermined game effect capable of being exhibited in a game on the basis of the comparison between the first information and the second information. Here, the game effect may have an arbitrary influence on a game that may be played by a user. For example, the game effect may include at least one of an effect of changing information related to game content that may be associated with information related to a user, and an effect of changing a parameter that that can be used in the game content selection processing and may be associated with the user. The game effect may be stored in the terminal storage unit 22 in a manner capable of being correlated with the comparison result in accordance with the matched characteristic information, the score, and the like. The terminal control unit 25 may update the information related to a user or the information related to game content associated with the user, which may be stored in the terminal storage unit 22, so that the game effect correlated with the comparison result may be capable of being exhibited. For example, the terminal control unit 25 may edit owned game content information included in the information related to a user, and may make an effect of additionally giving a new game content to the user be capable of being exhibited. In addition, the terminal control unit 25 may edit information of the game parameter included in the information related to a user, and may make an effect of increasing the number of items of game content associated with the user be capable of being exhibited when the game content selection processing may be subsequently requested by the user. In addition, the terminal control unit 25 may edit the characteristic information included in the information related to game content associated with the user, and may make an effect of giving game content, which may be given to the user, to the user after changing the characteristic information be capable of being exhibited.

The terminal control unit 25 may make another game effect be capable of being exhibited in correspondence with the first information. In addition, the terminal control unit 25 may make another game effect be capable of being exhibited in correspondence with the matched characteristic information and the score. For example, in the case of matching of the rarity, the terminal control unit 25 may make an effect of raising the rarity of the matched game content be capable of being exhibited. On the other hand, in the case of matching of the game content name, the terminal control unit 25 may make an effect of raising the level of the matched game content be capable of being exhibited differently from the case of matching of the rarity. In addition, even the case of matching of the game content name, the terminal control unit 25 may change a level that may be raised in correspondence with the score. In addition, a plurality of the game effects capable of being exhibited at a time may be present. In a case where the plurality of game effects are capable of being exhibited at a time, the game effects may be set to be exhibited in a manner different from a case where the effects can be individually exhibited. For example, in the case of matching of the game content name and the rarity, the terminal control unit 25 may make another game effect be capable of being exhibited in addition to the game effects which may be exhibited in the case of individual matching of the game content name or the rarity. In addition, in a case where a predetermined period such as a valid period is set to a game effect capable of being exhibited, the terminal control unit 25 may initiate management of the predetermined period.

When a predetermined game effect is exhibited, or when a predetermined period has elapsed without exhibition of the predetermined game effect, the terminal control unit 25 may make exhibition of the predetermined game effect be difficult. The terminal control unit 25 may determine whether or not the game effect capable of being exhibited may be exhibited or a predetermined period has elapsed without exhibition of the game effect. With regard to the exhibition of the game effect, for example, the game effect may be automatically exhibited when the game effect may be set to be capable of being exhibited, or may be exhibited when being explicitly selected through a user operation. In addition, with regard to exhibition of the game effect, it may be set to be exhibited for a limited number of times, and determination may be made as to whether or not the game effect has been exhibited by the limited number of times or a predetermined period has elapsed without exhibition. For example, the predetermined period may be set with an initiation point of time and a period such things as for 30 minutes from a state in which exhibition becomes possible. In addition, the predetermined period may be set with the initiation point of time and a termination point of time such things as from today to the end of the month. In a case where a target game effect is not exhibited and a predetermined period has not elapsed yet, the terminal control unit 25 may execute the determination again after elapse of a constant period. Here, the terminal control unit 25 may individually make a determination as to whether the game effect has been exhibited or a predetermined period has elapsed without exhibition for every game effect capable of being exhibited. In addition, the terminal control unit 25 may collectively make the determination with respect to a plurality of game effects capable of being exhibited.

Figure 6:
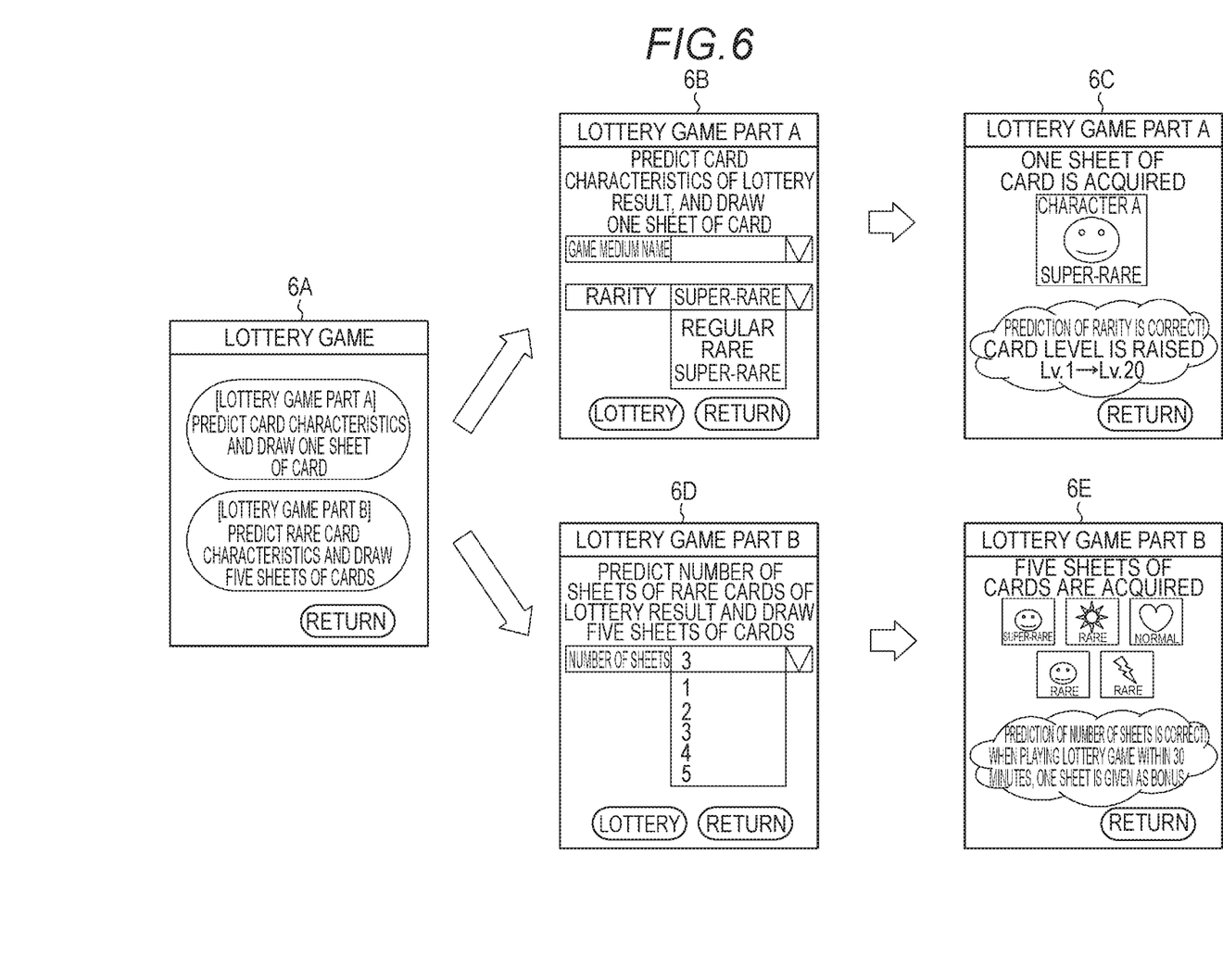
FIG. 6 is an exemplary embodiment of a display screen in a terminal device.

An example of the operation of the terminal device 20 according to this embodiment will be described with reference to FIG. 5 and FIG. 6. FIG. 6 may be an example of a display screen in which the display unit 23 and the input unit 24 are integrally provided in the terminal device 20. In 6A of FIG. 6, a user may select a game part from the input unit 24 of the terminal device 20. The terminal device 20 may present a plurality of game parts such as "lottery game part A: predict card characteristics and draw one sheet of card" and "lottery game part B: predict the number of sheets of rare cards and draw five sheets of cards". For example, when a user selects "predict card characteristics and draw one sheet of card", a screen including an interface that may accept a user operation as in 6B of FIG. 6 may be displayed. In 6B, the user may input the first information related to the game medium, and may make a request for initiation of the game content selection processing. For example, the user may set the first information in such a manner that rarity in characteristic information of the game content may be super-rare (1-1 of FIG. 5). In addition, in 6A of FIG. 6, the user may select "predict the number of sheets of rare cards and draw five sheets of cards". According to this, in 6D, the user can set information of the number of pieces through the displayed interface so that the number of items of game content that may have a rarity of "rare" is 3. The terminal control unit 25 may store characteristic information of game content such as "rarity may be rare" that may be set in advance, and information of the number of pieces such as "three sheets" that may be input in combination with each other as the first information (1-3 of FIG. 5).

When storing the first information related to the game medium, the terminal control unit 25 may initiate the present processing. Next, the terminal control unit 25 may store the second information related to the game content that may be associated with the user as a result of the game content selection processing. The second information may include information related to a plurality of items of game content in correspondence with the game content selection processing that may be performed. For example, in a case where the user may select the lottery game part A, one sheet of game content in 2-1 of FIG. 5 may be set as the second information. In addition, in a case where the user may select the lottery game part B, five sheets of items of game content from 2-1 to 2-5 in FIG. 5 may be set as the second information. The terminal control unit 25 may make a determination as to matching of the first information and the second information of game content which may be input on the basis of a user operation. When matching does not exist after comparison between the first information and the second information, the terminal control unit 25 may display a processing result on the display unit 23 and may terminate the present processing. In the example of FIG. 5, in a case where the second information illustrated in 2-1 may be received with respect to the first information illustrated in 1-1 as a result of the game content selection processing of the lottery game part A, the terminal control unit 25 may determine that 2-1 matches a condition of 1-1. For example, the terminal control unit 25 may make an effect of changing characteristic information of game content associated with a user such as "a level of a card medium associated with a user may be raised from 1 to 20" be capable of being exhibited as a predetermined game effect, and allows the effect to be exhibited. As a result, an item of game content with a level of 20 may be given to the user. As in 6C of FIG. 6, the terminal control unit 25 may display the processing result and contents of the game effect on the display unit 23. Similarly, in the example of FIG. 5, in the case of receiving the second information illustrated in from 2-1 to 2-5 with respect to the first information illustrated in 1-3 as a result of the game content selection processing of the lottery game part B, the terminal control unit 25 may determine that 2-2, 2-4, and 2-5 may be included in the second information, and thus matching of a condition of 1-3 may be established. For example, the terminal control unit 25 may make an effect of changing a game parameter which can be used in the game content selection processing and may be associated with a user such as "when playing a lottery game within 30 minutes, the number of card media associated with the user increases by one sheet" be capable of being exhibited as a predetermined game effect, and may display a processing result and contents of the game effect on the display unit 23 as in 6E of FIG. 6. Then, the terminal control unit 25 may determine whether or not a game effect capable of being exhibited may be exhibited, or a predetermined period has elapsed without exhibition. For example, in a case where a request for the game content selection processing may be not made for 30 minutes, the terminal control unit 25 may make exhibition of the game effect be difficult, and may terminate the present processing.

Description will be given of an example of an operation of the terminal device 20 according to an exemplary embodiment with reference to FIG. 7.

Step S101: The terminal control unit 25 may display an interface that may accept a user operation.

Step S102: The terminal control unit 25 may store the first information that relates to game content and may be input on the basis of the user operation.

Step S103: The terminal control unit 25 may store the second information related to game content that may be selected by the game content selection processing and may be associated with a user.

Step S104: The terminal control unit 25 may compare the first information and the second information which relate to the game medium, and may determine whether or not matching of at least a part may be established.

Step S105: In a case where the first information and the second information match each other (Yes in step S104), the terminal control unit 25 may display a comparison result of the first information and the second information on the display unit 23 to notify a user of the comparison result.

Step S106: The terminal control unit 25 may make a predetermined game effect be capable of being exhibited in another game in correspondence with comparison of the first information and the second information. In a case where a predetermined period is set to the game effect capable of being exhibited, the terminal control unit 25 may initiate management of the predetermined period.

Step S107: The terminal control unit 25 may determine whether or not the game effect capable of being exhibited is exhibited, or a predetermined period has elapsed without exhibition. In a case where a target game effect is not exhibited, and a predetermined period has not elapsed yet (No in step S107), the terminal control unit 25 may wait for a constant period, and may execute this step again.

Step S108: In a case where the target game effect is exhibited or a predetermined period has elapsed without exhibition (Yes in step S107), the terminal control unit 25 may make exhibition of the game effect be difficult, and may terminate the present processing.

Step S109: In a case where the first information and the second information do not match each other (No in step S104), the terminal control unit 25 may notify a user of a comparison result of the first information and the second information through the display unit 23, and may terminate the present processing.

As described above, the terminal device 20 according to this embodiment may display an interface that may accept a user operation. The terminal device 20 may store the first information related to game content on the basis of the user operation that may be accepted by the interface. The terminal device 20 may store the second information related to game content that may be selected among a plurality of the items of game content by the game content selection processing and may be associated with a user. In addition, the terminal device 20 may compare the first information and the second information with each other. The terminal device 20 may display a comparison result of the first information and the second information. The terminal device 20 make a predetermined game effect be capable of being exhibited in a game on the basis of the comparison of the first information and the second information. In this manner, in a game such a lottery game in which the game content selection processing is performed, participation of the user may be increased by accepting an input through the user operation, and the game corresponding to the user input may not be made to be monotonous. Accordingly, a user motivation to continue playing the game may be improved. In addition, the selection processing of the user, comparison processing of information, and the like may be added, and thus a data amount related to processing and a significant increase in processing load may be caused less in comparison to the case of individually creating game content selection processing in correspondence with necessity, and thus it may be possible to diversify the game content selection processing by the user.

The terminal device 20 according to this embodiment may accept the first information related to the game content which may include at least one of the characteristic information of the game content such as the game content name, the rarity, the level, the cost, the number of usable times, and the selection probability, and the information of the number of items of game content on the basis of the user operation. In this manner, as a comparison target of the game content selection processing in the lottery game and the like, a combination that may be input by a user as the first information may be increased. Accordingly, the game is made less monotonous, and thus a user motivation to continue playing the game may be improved.

The terminal device 20 according to this embodiment may determine whether or not a part or entirety of the first information based on the user operation, and a part or the entirety of the second information selected by the game content selection processing match each other in a step of comparing the first information and the second information with each other. In this manner, since determination may be made as to whether or not a part or the entirety of the input by the user operation and a part or the entirety of the game content selection processing result match each other, the game made to be less monotonous, and thus it may be possible to improve a user motivation to continue playing the game.

The terminal device 20 according to this embodiment may make a predetermined game effect, which may be different depending on the first information based on the user operation, be capable of being exhibited. According to this, another game effect may be made to be capable of being exhibited in correspondence with the user operation, and thus the game may be not made to be monotonous and it may be possible to improve a user motivation to continue playing the game.

The terminal device 20 according to this embodiment may make a game effect, which may include at least one of the effect of changing information related to game content that may be associated with a user, and an effect of changing a parameter that can be used in the game content selection processing and may be associated with the user, be capable of being exhibited. According to this, game content given for every user can be made to vary or contents of the game content selection processing can be made to vary for every user, and a variation of a game effect that may be provided may be increased, and thus it may be possible to improve a user motivation to continue playing a game.

The terminal device 20 according to this embodiment can exhibit an effect of changing a parameter that can be used in the game content selection processing when the game content selection processing is executed subsequently or later. According to this, it may be possible to motivate a user to execute the subsequent or later game content selection processing, and it may be possible to improve a user motivation to continue playing a game.

In a case where a predetermined game effect may be exhibited by a user, or a predetermined period has elapsed without exhibition of the predetermined game effect, the terminal device 20 according to this embodiment may make exhibition of the predetermined game effect be difficult. According to this, the upper limit of the number of times of exhibition of the game effect, or a period in which the game effect can be exhibited may be set. Accordingly, it may be possible to motivate a user to perform the game content selection processing again in the period, and it may be possible to improve a user motivation to continue playing a game.

The invention has been described on the basis of various drawings and examples, but it should be understood that various modifications or changes can be easily made by those skilled in the art on the basis of the present disclosure. Accordingly, it should be understood that the modifications and variations may be included in the scope of the invention. For example, functions included in respective units, respective steps, and the like, and the like can be rearranged without logical contradiction, and a plurality of units, a plurality of steps, and the like can be combined into one, or can be divided.

For example, in the above-described embodiment, a part or the entirety of the operation and the processing which may be executed by the server device 10 can be configured to be executed by the terminal device 20. Similarly, a part of the operation that may be executed by the terminal device 20 can be configured to be executed by the server device 10. For example, processing such as the display control of various screens displayed on the terminal device 20, and the control of various GUIs may be executed by one of the server device 10 and the terminal device 20, or may be cooperatively executed by the server device 10 and the terminal device 20. Alternatively, the game system 1 may not include the server device 10. In this case, the terminal device 20 may store information received from the server device 10 in the above-described embodiment in advance.

Figure 7:
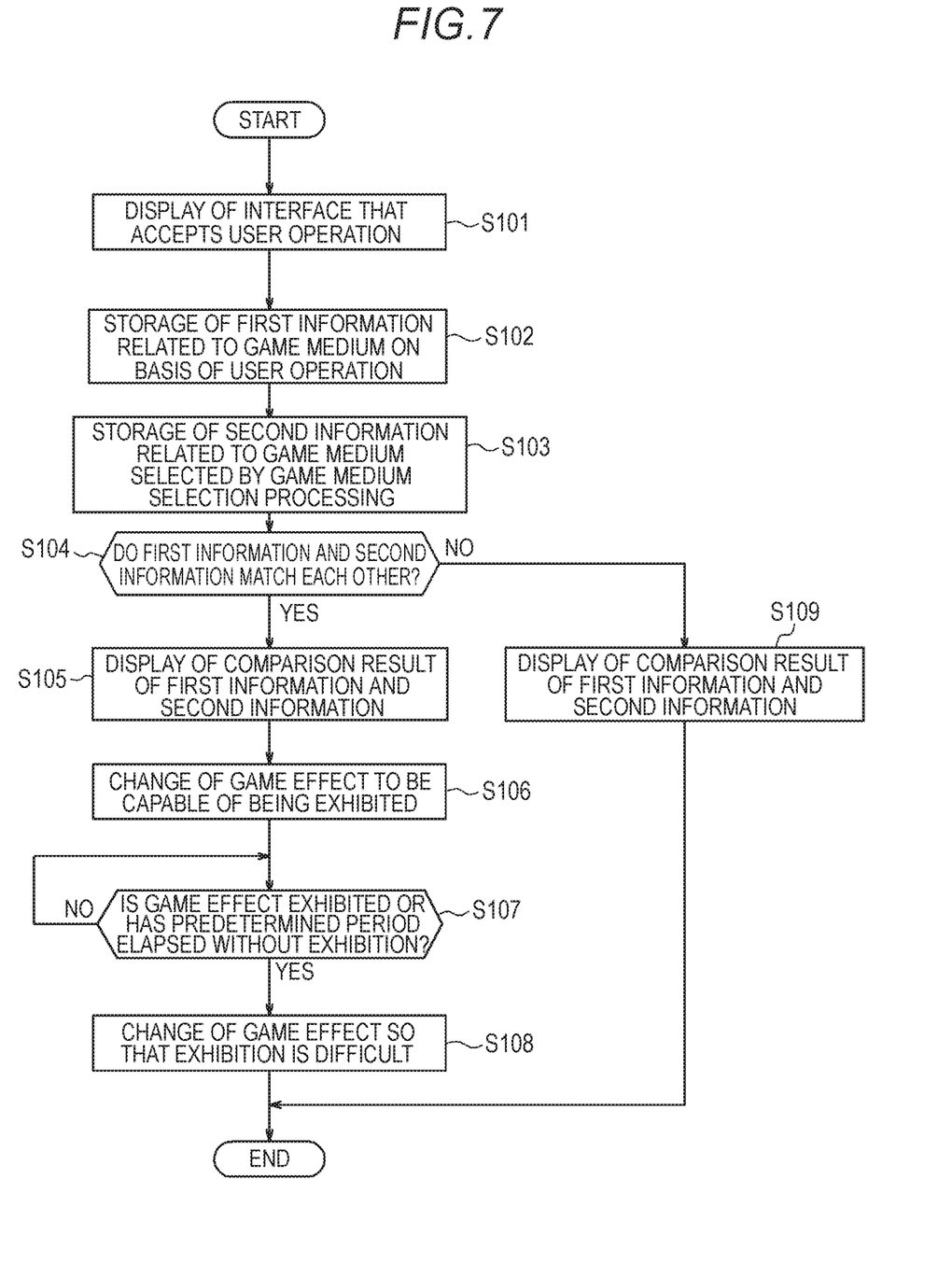
FIG. 7 is an exemplary embodiment of a flowchart illustrating an operation of the terminal device.

In addition, in the above-described embodiment, description has been given of an example of the operation of the terminal device 20 with reference to FIG. 7. However, partial steps included in an operation, or partial operations included in one step may be omitted. Sequences of a plurality of steps may be substituted with each other in a range without logical contradiction.

In addition, in the above-described embodiment, at least a part of the screens displayed on the terminal device 20 may be set as a web display in which the terminal device 20 may be caused to display an interface on the basis of data generated by the server device 10, and at least a part of the screens may be set as native display in which display may be performed by a native application installed in the terminal device 20. As described above, the game according to the above-described embodiment may be set as a hybrid game in which the server device 10 and the terminal device 20 partially take charge of the processing of the game.

In addition, an information processing device such as a computer and a portable telephone may be appropriately used to function as the server device 10 or the terminal device 20 according to the above-described embodiment. The information processing device can be realized by storing a program, which describes processing contents for realization of respective functions of the server device 10 or the terminal device 20 according to this embodiment, in a storage unit of the information processing device, and by reading out and executing the program by a CPU of the information processing device.

The invention claimed is:

1. A non-transitory computer-readable medium embodying program code that, when executed, causes an information processing device configured to execute a game to execute:
    a step of causing an interface configured to accept a user operation to be displayed;
    a step of storing first information related to game content on the basis of the user operation that is accepted by the interface;
    a step of storing second information related to an item of game content that is selected from among a plurality of items of game content by game content selection processing and is associated with a user;
    a step of comparing the first information and the second information;
    a step of causing a comparison result of the first information and the second information to be displayed; and
    a step of making a predetermined game effect capable of being exhibited in the game on the basis of comparison of the first information and the second information, wherein said step of making the predetermined game effect capable of being exhibited in the game comprises:
        maintaining, in a memory of the information processing device, a first record indicating an exhibition state of the predetermined game effect, and a second record indicating a time that has elapsed since a last exhibition of the predetermined game effect;
        automatically verifying and authenticating, against the first record and the second record, whether a first condition that the predetermined game effect is already active is met and whether a second condition that the predetermined period has elapsed without exhibition of the predetermined game effect is met; and
        executing first processing comprising at least one of changing information related to the game content associated with the user and changing a parameter associated with the user when neither condition is met, and executing second processing different from the first processing when at least one condition is met.

2. The non-transitory computer-readable medium according to claim 1, wherein the first information includes at least one of characteristic information of the selected item of game content and information of the number of the plurality of items of game content.

3. The non-transitory computer-readable medium according to claim 1, wherein in the step of comparing the first information and the second information with each other, determination is made as to whether or not at least a part of the first information and at least a part of the second information match each other.

4. The non-transitory computer-readable medium according to claim 1, wherein the predetermined game effect is different depending on the first information.

5. The non-transitory computer-readable medium according to claim 1, wherein the game content selection processing is executed by using the parameter that is associated with the user.

6. The non-transitory computer-readable medium according to claim 5, wherein a predetermined game effect comprises the effect of changing the parameter that can be used in the game content selection processing; and
    wherein the information processing device performs game content selection processing after the parameter that can be used in the game content selection processing has been changed.

7. The non-transitory computer-readable medium according to claim 1, wherein the second processing is a step of making exhibition of the predetermined game effect more difficult.

8. An information processing device, comprising:
    a display unit;
    an input unit that can accept a user operation with respect to the display unit;
    a storage unit; and
    a control unit that executes a game,
    wherein the control unit
    causes an interface that accepts the user operation on the display unit to be displayed,
    stores first information related to game content in the storage unit on the basis of the user operation that is accepted by the interface,
    stores second information related to an item of game content that is selected among a plurality of items of game content by game content selection processing and is associated with a user in the storage unit, compares the first information and the second information, causes a comparison result of the first information and the second information to be displayed on the display unit, and makes a predetermined game effect capable of being exhibited in the game on the basis of comparison of the first information and the second information, wherein the control unit specifically operates to make the predetermined game effect capable of being exhibited in the game by steps of:

maintaining, in the storage unit, a first record indicating an exhibition state of the predetermined game effect, and a second record indicating a time that has elapsed since a last exhibition of the predetermined game effect;

automatically verifying and authenticating, against the first record and the second record, whether a first condition that the predetermined game effect is already active is met and whether a second condition that the predetermined period has elapsed without exhibition of the predetermined game effect is met; and executing first processing comprising at least one of changing information related to the game content associated with the user and changing a parameter associated with the user when neither condition is met, and executing second processing different from the first processing when at least one condition is met.

9. A method of controlling an information processing device that executes a game, comprising:

a step of causing an interface that accepts a user operation to be displayed;

a step of storing first information related to game content on the basis of the user operation that is accepted by the interface;

a step of storing second information related to an item of game content that is selected among a plurality of items of game content by game content selection processing and is associated with a user;

a step of comparing the first information and the second information;

a step of causing a comparison result of the first information and the second information to be displayed; and a step of making a predetermined game effect capable of being exhibited in the game on the basis of comparison of the first information and the second information, wherein said step of making the predetermined game effect capable of being exhibited in the game comprises:

maintaining, in a memory of the information processing device, a first record indicating an exhibition state of the predetermined game effect, and a second record indicating a time that has elapsed since a last exhibition of the predetermined game effect;

automatically verifying and authenticating, against the first record and the second record, whether a first condition that the predetermined game effect is already active is met and whether a second condition that the predetermined period has elapsed without exhibition of the predetermined game effect is met; and executing first processing comprising at least one of changing information related to the game content associated with the user and changing a parameter associated with the user when neither condition is met, and executing second processing different from the first processing when at least one condition is met.

10. The non-transitory computer-readable medium according to claim 2, wherein in the step of comparing the first information and the second information with each other, determination is made as to whether or not at least a part of the first information and at least a part of the second information match each other.

11. The non-transitory computer-readable medium according to claim 2, wherein the predetermined game effect is different depending on the first information.

12. The non-transitory computer-readable medium according to claim 3, wherein the predetermined game effect is different depending on the first information.

13. The non-transitory computer-readable medium according to claim 2, wherein the game content selection processing may be executed by using a parameter that is associated with the user, and the predetermined game effect includes at least one of an effect of changing information related to game content that may be associated with the user, and an effect of changing the parameter that can be used in the game content selection processing.

14. The non-transitory computer-readable medium according to claim 3, wherein the game content selection processing may be executed by using a parameter that is associated with the user, and the predetermined game effect includes at least one of an effect of changing information related to game content that may be associated with the user, and an effect of changing the parameter that can be used in the game content selection processing.

15. The non-transitory computer-readable medium according to claim 4, wherein the game content selection processing may be executed by using a parameter that is associated with the user, and the predetermined game effect includes at least one of an effect of changing information related to game content that may be associated with the user, and an effect of changing the parameter that can be used in the game content selection processing.

16. The non-transitory computer-readable medium according to claim 2, wherein the information processing device is further configured to execute:

a step of making exhibition of the predetermined game effect more difficult in a case where the predetermined game effect is already exhibited or a predetermined period has elapsed without exhibition of the predetermined game effect.

17. The non-transitory computer-readable medium according to claim 3, wherein the information processing device is further configured to execute:

a step of making exhibition of the predetermined game effect more difficult in a case where the predetermined game effect is already exhibited or a predetermined period has elapsed without exhibition of the predetermined game effect.

18. The non-transitory computer-readable medium according to claim 4, wherein the information processing device is further configured to execute:

a step of making exhibition of the predetermined game effect more difficult in a case where the predetermined game effect is already exhibited or a predetermined period has elapsed without exhibition of the predetermined game effect.

19. The non-transitory computer-readable medium according to claim 5, wherein the information processing device is further configured to execute:
a step of making exhibition of the predetermined game effect more difficult in a case where the predetermined game effect is already exhibited or a predetermined period has elapsed without exhibition of the predetermined game effect.

20. The non-transitory computer-readable medium according to claim 6, wherein the information processing device is further configured to execute:
a step of making exhibition of the predetermined game effect more difficult in a case where the predetermined game effect is already exhibited or a predetermined period has elapsed without exhibition of the predetermined game effect.

* * * * *